United States Patent [19]

Patton et al.

[11] Patent Number: 4,868,745
[45] Date of Patent: Sep. 19, 1989

[54] DATA PROCESSING SYSTEM AND METHOD FOR THE DIRECT AND INDIRECT EXECUTION OF UNIFORMLY STRUCTURED OBJECT TYPES

[75] Inventors: Charles M. Patton, Eugene; Laurence Grodd, Portland; William C. Wickes, Corvallis, all of Oreg.

[73] Assignee: Hewlett-Packard Company, Palo Alto, Calif.

[21] Appl. No.: 868,978

[22] Filed: May 30, 1986

[51] Int. Cl.[4] ............................................. G06F 12/08
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,249,241 | 2/1981 | Aberle | 364/200 |
| 4,325,120 | 4/1982 | Colley et al. | 364/200 |
| 4,503,492 | 3/1985 | Pilat | 364/200 |
| 4,584,639 | 4/1986 | Hardy | 364/200 |
| 4,675,810 | 6/1987 | Gruner et al. | 364/200 |

OTHER PUBLICATIONS

Dahlby, S. H. et al., "The IBM System/38: A High-Level Machine" in Computer Structures: Principles and Examples, McGraw-Hill, 1982, pp. 533-536.
Pinnow, K. W. et al., "The IBM System/38: Object-Oriented Architecture" in Computer Structures: Principles and Examples, McGraw-Hill, 1982, pp. 537-540.
Berstis, V. et al., "The IBM System/38: Addressing and Authorization", in Computer Structures: Principles and Examples, McGraw-Hall, 1982, pp. 540-544.
Hoffman, R. L. et al., "The IBM System/38: Hardware Organization of the System/38" in Computer Structures: Principles and Examples, McGraw-Hill, 1982, pp. 544-545.
Levy, H. M., "Capability Based Computer Systems", Digital Equipment Corporation, 1984, pp. 21-39.

*Primary Examiner*—David L. Clark

[57] ABSTRACT

In a data processing system, uniformly structured objects are indifferently mixed in object memory with object pointers. The objects address prologues of object execution sequences in memory. The object pointers address other objects. The objects are properly evaluated whether directly or indirectly addressed. An interpreter pointer selectively points to or addresses objects or object pointers.

When an object is directly addressed by the interpreter pointer, the addressee of the object's addressee in memory is addressed which initiates the object execution sequence.

When an object is indirectly addressed, the pointer addresses an object pointer. The object pointer addresses an object. The object's addressee in memory is addressed which initiates the object execution process.

10 Claims, 19 Drawing Sheets

DATA PROCESSING SYSTEM AND METHOD FOR THE DIRECT AND INDIRECT EXECUTION OF UNIFORMLY STRUCTURED OBJECT TYPES

TECHNICAL FIELD

This invention relates generally to systems and methods for data processing and more particularly to systems and methods for performing arithmetic and other data processing operations on pluralities of uniformly structured data objects, stored in an area of main or auxiliary memory, for example, and additionally to arrangements and methods for sequentially or selectively evaluating each of the objects.

BACKGROUND ART

In prior art data processing systems there are two principle processing methods or architectures used in evaluating data. These are direct evaluation schemes and indirect evaluation schemes.

In the direct evaluation schemes of the prior art, the interpreter pointer, which determines the order of evaluation of the objects, always points directly at the object. That is, it never points at a pointer to the object, that is, an object pointer. When the object is evaluated, code or data associated with the object is executed and the interpreter pointer is updated to address the next object in the sequence of objects.

In the indirect evaluation schemes of the prior art, the interpreter pointer always points at a pointer to the object. When the object is evaluated, the code or data associated with the object is executed and the interpreter pointer is updated to address the next pointer.

In the direct evaluation scheme in prior art devices, the simple inclusion of a pointer among the data objects would lead to the misinterpretation of the object and consequential undesired results.

Similarly, in the indirect case in prior art devices, the simple inclusion of an object among the pointers would also lead to undesirable effects.

In prior art data processing systems, there have been several attempts at ameliorating the above described defiency. In particular, in the direct evaluation scheme, occasionally there has been introduced the concept of an object whose body is interpreted as a pointer. This object, however, cannot itself be indirectly evaluated.

In the indirect evaluation schemes, in the prior art, the notion of an indirect object with a body embedded in the execution sequence is fairly standard. This has the severe shortcoming, however, that its location, that is, directly in the evaluation sequence, is fixed by its structure and such an object can only be evaluated in this peculiar indirect-with-an-embedded-body manner.

DISCLOSURE OF INVENTION

Improvements over such typical prior art as described above are achieved with the data processing system and object execution process of this invention, which provide for correct and automatic evaluation of both objects and object pointers which are now indifferently included in the execution sequence. Moreover, the objects are provided with a uniform structure so that all objects can be indifferently executed, either directly or indirectly. Objects of different types are still uniformly structured. Each comprises at least a prologue address and a body. These two parts are contiguous in memory. The prologue address addresses a prologue which describes execution of the object. The body is data. An object is pointed to, or addressed, if its prologue address part is pointed to or addressed.

The object may be a single object or a composite object. If its body is a sequence of objects and/or object pointers it is a composite object.

In the direct execution of an object, an interpreter pointer points to the prologue address of an object. This prologue address addresses a prologue of object execution in memory which directly identifies an object to execute. In indirect execution of an object the interpreter pointer points to an object pointer which in turn points to or addresses the prologue address of an object which is the object to execute. Since the object pointer does not address a prologue in memory, there is no direct identification of an object to execute.

Thus in providing uniformity of structure among the object, in which each comprises a prologue address and a body, in the provision of prologues of object execution and the use of object pointers and interpreter pointers in which interpreter pointers and object pointers may selectively identify objects by pointing to their prologue address parts and, additionally, in which an interpreter pointer may point to an object pointer, a simple technique is provided, permitting intermixing of objects and object pointers for direct or indirect object execution with a minimum of processing steps. This reduces programming and conserves memory which significantly reduces processing overhead.

BEST MODE FOR CARRYING OUT THE INVENTION

Figure 5:
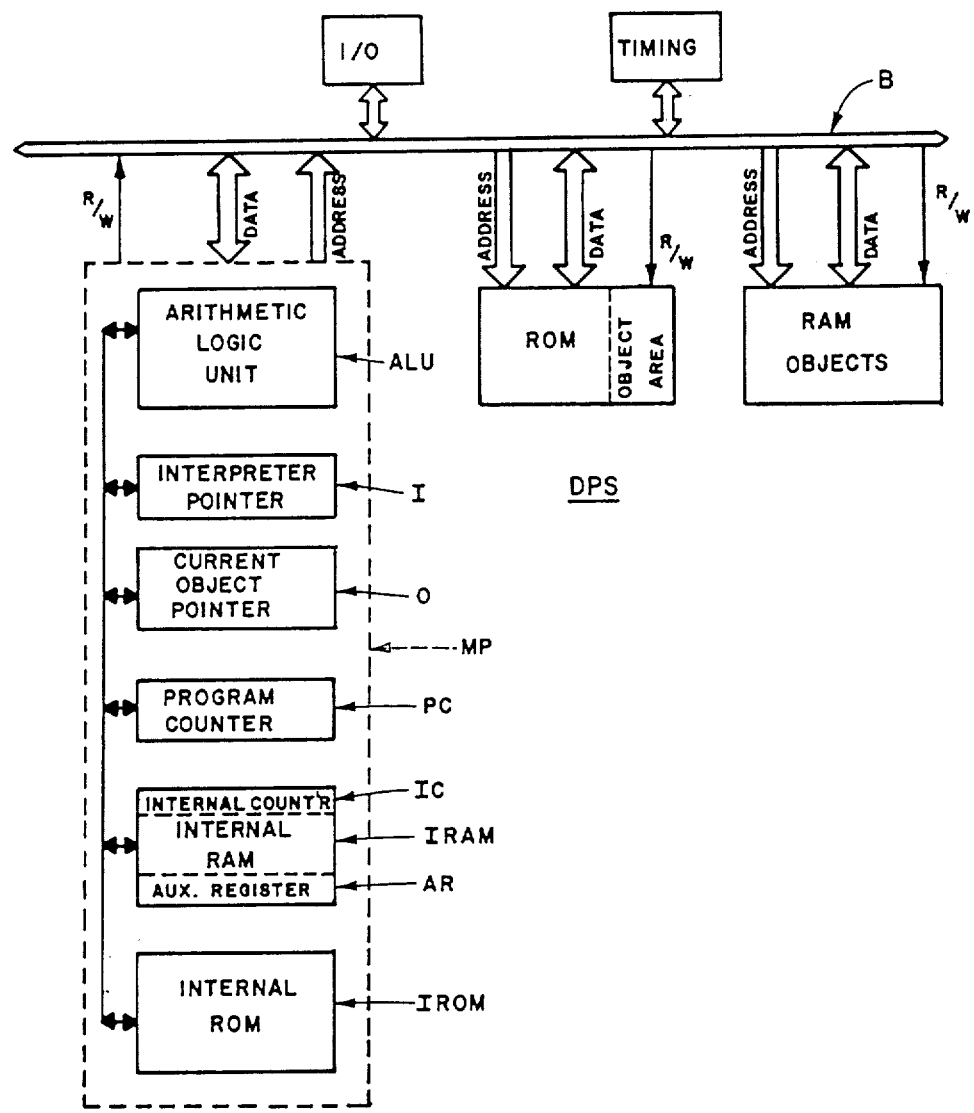
FIG. 5, is a general block diagram of a data processing system having architecture, comprising: objects in memory, pointers, counters and processing capabilities for implementing this invention.
Figure 6B:
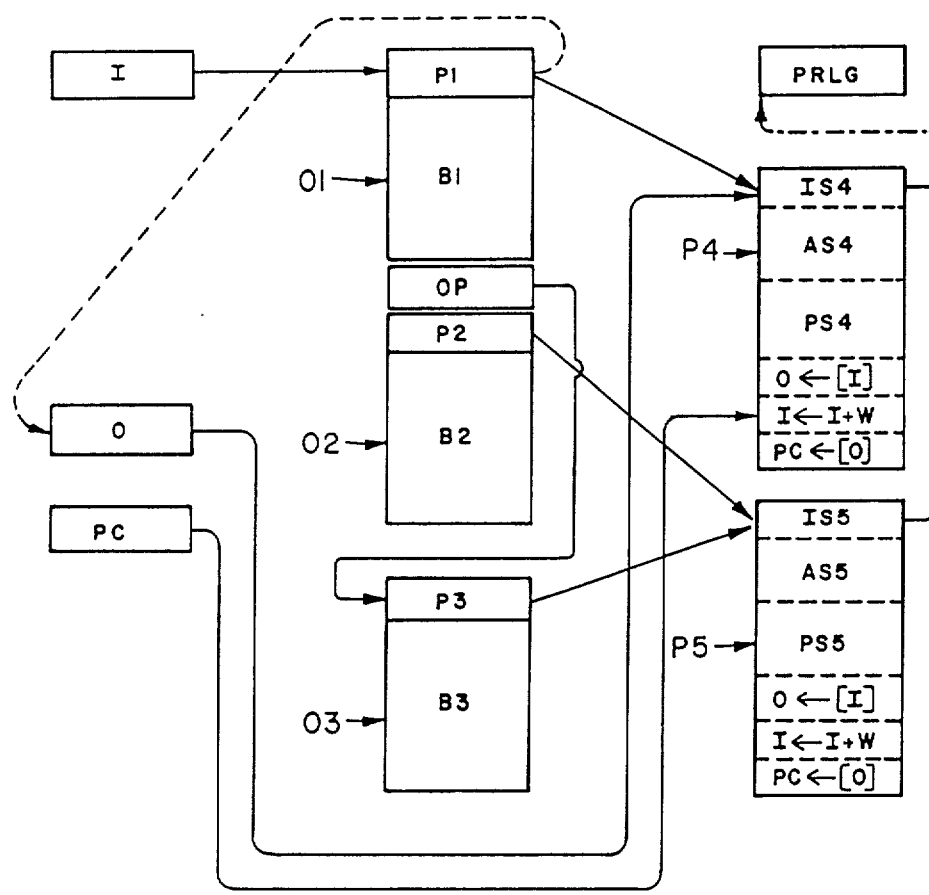
FIGS. 6A through 6E, illustrate the respective process steps, together with the data processing components and their organization, in the unique direct execution of an object according to this invention.
Figure 6A:
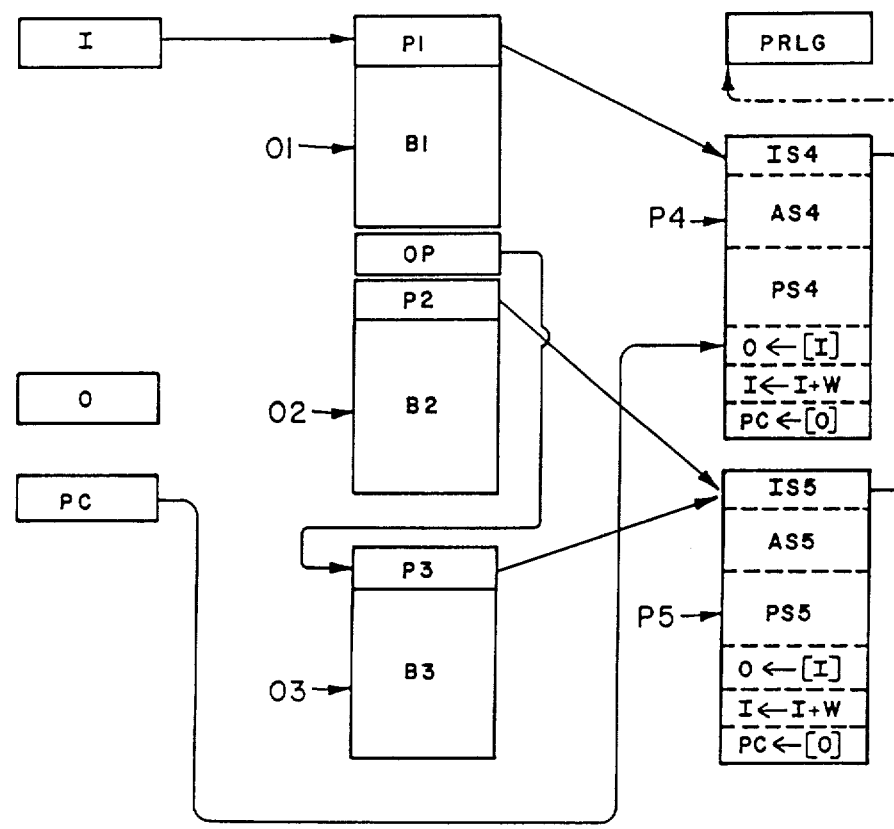

Referring to FIGS. 5 and 6A, this invention provides an object storage area or memory RAM, FIG. 5 and an immobile code area or memory, ROM in which object execution or processing instructions are stored. Objects 01, 02, 03 and object pointers OP, see FIG. 6A are stored together indifferently in the object storage area. Each object, FIG. 1, comprises a prologue address which in the address of a location in the immobile code area ROM. Each object pointer OP, FIG. 6A, addresses an object in the object storage area RAM.

The immobile code area RDM, FIG. 5, comprises one area, called a prologue P4, P5, FIG. 6A, storing object execution sequences IS, AS, PS and a second area storing prologue redirection sequences PRLG. The object addresses are called prologue addresses P1, P2, P3. Each prologue location IS4, IS5, addressed by a prologue address P1, P2, P3, addresses the prologue redirection sequence PRLG. An interpreter pointer I addresses objects 01, 02, 03 and object pointers OP selectively. When an object such as 01 is addressed by the interpreter pointer I, its prologue address P1, in this example, addresses a prologue location, IS4 which in turn addresses the prologue redirection sequence PRLG. This, among other functions, identifies and initiates the direct execution of an object, involving redirection sequences PRLG and execution sequences AS4, PS4, for example.

Object pointers, such as object pointer OP, used in indirect object execution, are stored among the objects. Each object pointer OP addresses a specific object, such as object 03. When the interpreter pointer I points to an object pointer OP, see FIG. 7A, a specific object such as object 03, is indirectly addressed, i.e., the prologue address P3 of that specific object is indirectly addressed. The prologue address P3 of that specific object, again, addresses a prologue location such as prologue initialization sequence IS5. This, among other functions, indentifies and initiates indirect object execution which differs from direct object execution and does not involve the redirection sequences RRLG.

Definitions

Prologue Redirection Sequence (PRLG)

The prologue redirection sequence is in the immobile code area or memory ROM at a fixed location which is determined by a prologue initialization sequence IS.

The prologue redirection sequence PRLG initiates the adjustment or stepping of interpreter pointer I by a microprocessor word length to point past the body B of an object and redirects execution to the data processing segment PS4 or PS5 of the prologue P4 or P5.

Prologue

The prologue P4 or P5 is any code slice in the immobile code area or memory, FIG. 6A, and comprises as seen in FIG. 6A, a prologue initialization sequence (IS), an indirect adjustment sequence (AS) and a data processing sequence (PS).

The prologue initialization sequence IS is the address of the prologue redirection sequence PRLG, FIG. 6A, in immobile code memory. This initialization sequence serves the dual purpose of causing the prologue redirection sequence PRLG to be executed when an object, such as object 01, is directly addressed by the interpreter pointer I and executed, and causes the prologue indirect adjustment sequence AS to be executed instead when an object, such as object 03, is addressed indirectly, via an object pointer OP.

The prologue data processing sequence (PS) provides input to the microprocessor carry out conventional data processing for any type of object.

Object

Figure 1:
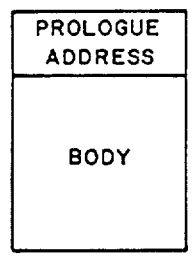
FIG. 1, conceptually depicts the unique structure of an object according to this invention.

An object, FIG. 1, comprises a prologue address and a body which is data. The prologue address and the body are contiguous in object storage or memory, RAM, FIG. 5. The prologue in the immobile code area or memory, as described above, distinguishes objects from object pointers.

Figure 2:
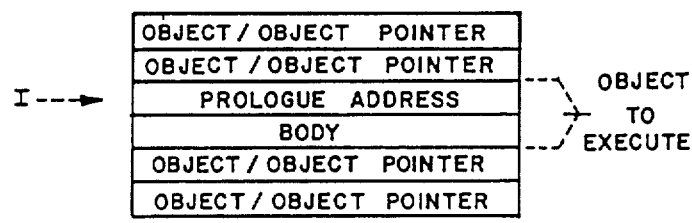
FIG. 2, illustrates the initiation of direct object execution using a composite object structured according to this invention.
Figure 3:
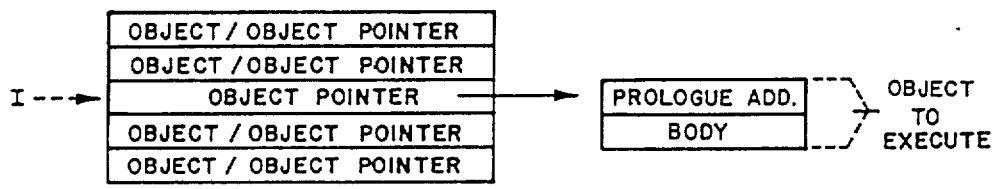
FIG. 3, illustrates initial steps in indirect object execution using a composite object structured according to this invention.

The objects may be of different types. The different types, while uniformly structured, being classified or distinguished by the prologue address. Thus two objects are of the same type if the prologue address parts are equal. In this case the bodies will have the same logical structure. Therefore, a prologue address serves the dual purpose of initiating object execution and identifying the object type. FIG. 1, conceptually depicts an object in its simplest form, in object storage or memory RAM or ROM, comprising a prologue address and a body. FIGS. 2 and 3 depict composite objects in object storage or memory.

Pointer

A pointer as employed in this application is defined to be an address and may be either a location pointer (Prologue Address) such as P1, FIG. 6A, or an object pointer. A location pointer addresses any segment of the memory map while an object pointer specifically addresses an object. The importance of this distinction is evident in the execution of an object, as will become apparent, wherein an interpreter pointer I, FIG. 6A, which directs interpretive execution, addresses the prologue address of an object P1 or P2 or P3, to address a segment of the memory map, IS4, IS5, in direct object execution, and addresses an object pointer OP, which in itself is an address and specifically addresses the prologue address of an object, in indirect object P1, P2, or P3, P3 being execution. The prologue address part of an object is a location pointer.

The interpreter pointer I, FIG. 6A, as used herein, is the address of the next object, 01, 02, or 03, or object pointer OP in an executing object. The current object pointer O (not object pointer OP), as used herein, is the address of the current object which is being executed.

Direct/Indirect Object Execution

FIGS. 2 and 3, respectively, illustrate the initiation of direct and indirect object execution. These figures depict composite objects in the object area of memory RAM or ROM. These composite objects comprise an indifferent mix of objects and object pointers. All objects comprise the prologue address and body shown in FIG. 1, although, in FIG. 2, only the selected object is shown in this detail. In FIG. 2, the interpreter pointer I points to the prologue address of the selected object which is identified as the object to execute. In FIG. 3, the interpreter pointer I points to an object pointer OP which points to the prologue address of the object to execute and thus indirectly selects the object to execute.

As will be explained, a program counter PC, FIG. 6A, initiates object execution, referred to as the start of the inner loop. In direct object execution, FIG. 2, the interpreter pointer I points to the prologue address of an object in the object area of memory RAM or ROM, which object comprises the illustrated prologue address and the body and is identified as the object to execute by direct object execution. Briefly stated, the inner loop is the interpretive mechanism by which the components of the object area are sequentially or selectively executed. These components may be either objects or object pointers. In the former case, the object itself is executed by the inner loop and this is defined to be direct object execution. In the latter case, the object addressed by the object pointer is executed by the inner loop. This latter case is depicted in FIG. 3, and is defined to be indirect object execution.

Figure 6C:
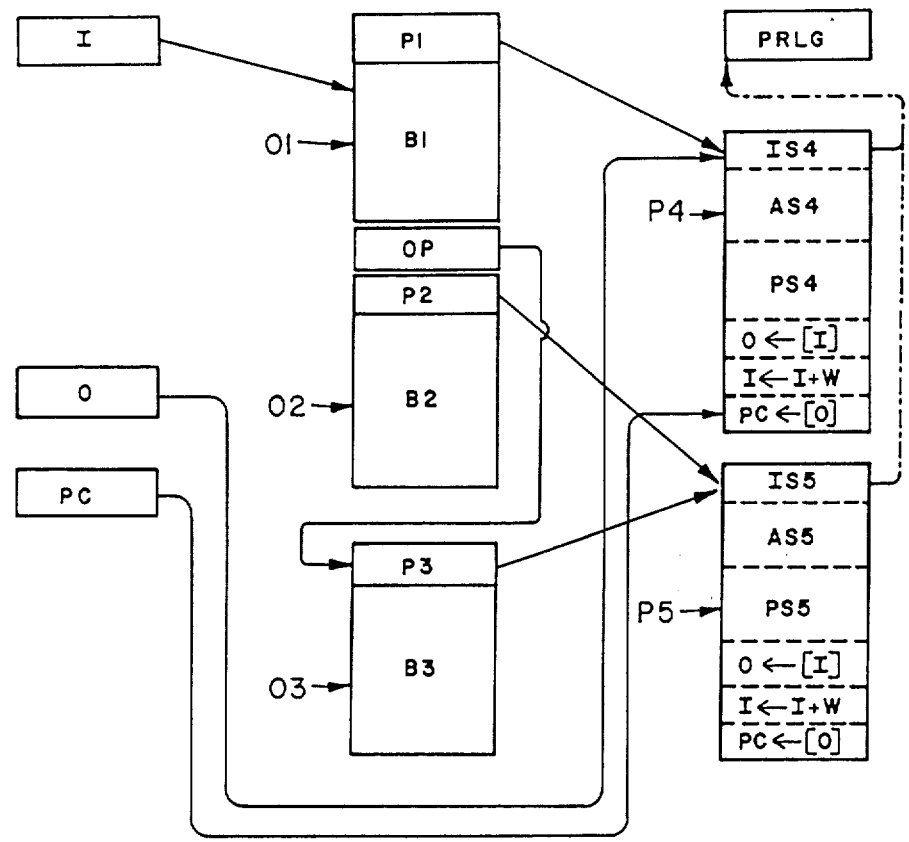

In direct execution, the inner loop sets a current object pointer O, FIG. 6B, to the prologue address of a location in immobile memory, ROM, and increments the interpreter pointer I, FIG. 6C, to point to the body B1 of the object in object memory. The inner loop, FIG. 6D then loads a program counter PC with the contents of the immobile memory location IS4, FIG. 6D, addressed by the current object pointer O which and the program counter is thereafter incremented to point to the rest PS of the executing prologue P4 which is then, of course, executed.

Figure 7A:
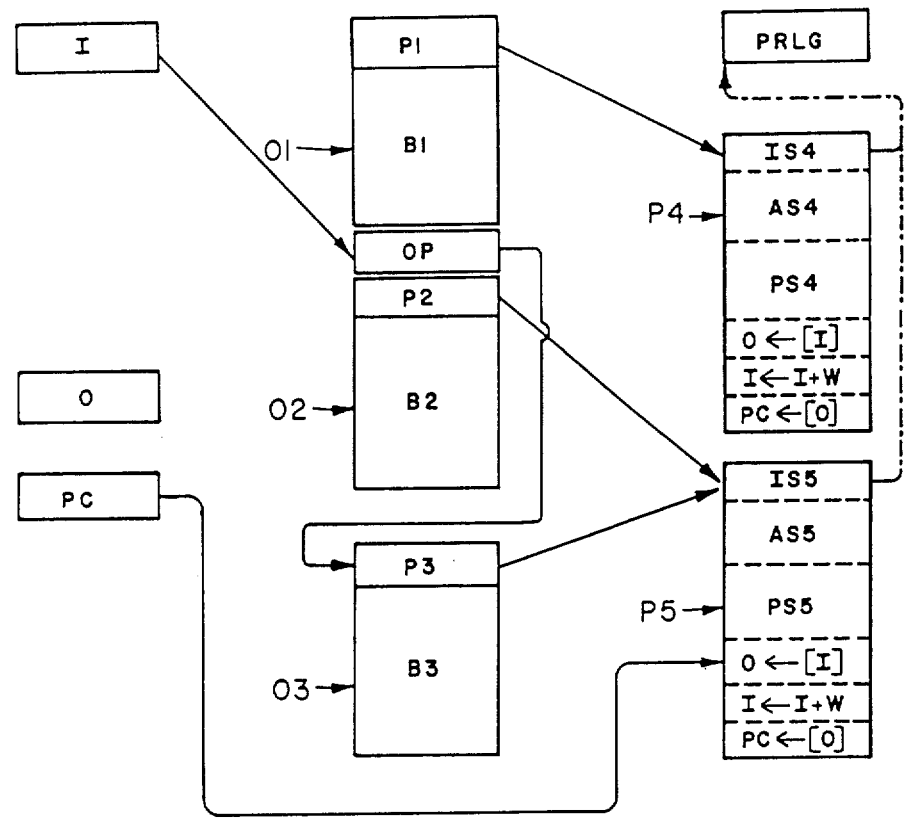
FIGS. 7A through 7E, illustrate the respective process steps, together with the data processing components and their organization, in the unique indirect execution of an object according to this invention.

In the case of indirect execution, FIG. 7A, the inner loop is executing an object pointer OP. FIG. 3 depicts a portion of the object storage area or memory, at the start of the inner loop. Here, the interpreter pointer I points to an object pointer OP, which in turn points to the prologue address P3 of the object 03 to execute, which prologue address determines the type of the object. As will be explained, the inner loop, FIG. 7B, loads the current object pointer O with the contents of the object pointer OP (or the prologue address) which is pointed to by the interpreter pointer I. The object pointer OP contains the address of the object to be executed. The interpreter pointer I, FIG. 7C, is now incremented to point past the object pointer and a program counter PC, FIG. 7D, is loaded with the prologue address of the object addressed by the current object pointer O to point to a first part of a prologue IS5 having a data processing sequence and is therefore incremented, FIG. 7E, to point to the rest PS5 of the executing prologue P5 which is then, of course, executed.

All prologues are location-fixed, that is, either reside at fixed addresses in immobile memory, ROM, or are logically implemented in a list of small program steps called Microcode, or in hardware.

Object Sizes

Figure 4A:
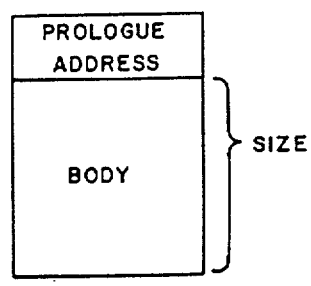
FIGS. 4A, 4B and 4C, depict differing object sizing techniques providing object size information used in incrementing pointers.
Figure 4B:
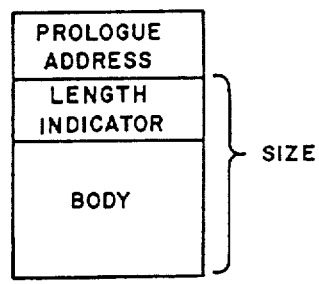
Figure 4C:
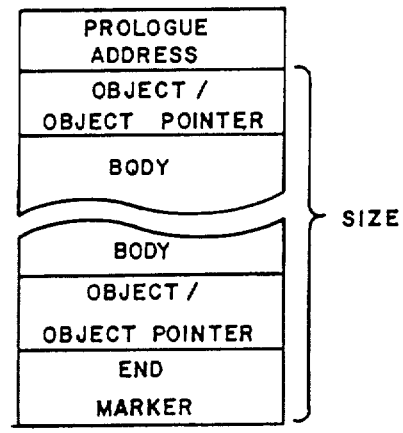

In incrementing the interpreter pointer I, the current object pointer O, and the program counter PC, it is necessary to know the size of the individual objects. FIGS. 4A, 4B and 4C, depict three different object sizing techniques.

In FIG. 4A, the size of the object is determined by the prologue alone.

In FIG. 4B, the size of the object is determined jointly by the prologue and a length indicator in the object body. This object is defined as a counted size object.

In FIG. 4C, which depicts a composite or secondary object. The size is determined recursively from the sizes of all of the objects and object-pointers which comprise the object, up to and including the end-marker which has a structure corresponding to the prologue. The end marker is defined as a fixed object or object-pointer.

Data Processing System

FIG. 5, is a block diagram of a data processing system DPS for implementing the presently preferred embodiment of this invention. The data processing system DPS includes a micro processor MP, a read only memory ROM, and a random access memory RAM, all of which are interconnected by a bus B.

The microprocessor MP, includes an arithmetic logic unit ALU, an interpreter pointer I, a current object pointer O, a program counter PC, an internal read only memory IROM, and an internal random access memory IRAM. The internal random access memory IRAM, comprises an auxiliary register AR and an internal counter IC.

The bus B, provides bi-directional connections with the random access memory RAM, the read only memory ROM, the microprocessor MP, and an input/output device I/O. The bi-directional coupling between the bus B and the microprocessor MP implies bi-directional connection of the bus with all of the elements of the microprocessor. Additionally all of the elements of the microprocssor are bi-directional connected internally of the microprocessor, primarily for control, by the arithmetic logic unit ALU, and, additionally for access to one another, for the purpose of incrementing the interpreter pointer I, incrementing the current object pointer O, for loading, off-loading and incrementing the program counter PC, for addressing and accessing the internal read only memory IROM and for addressing and accessing the internal random access memory IRAM, its auxilliary register AR and its internal counter IC.

Multiplexing in FIG. 5 is simulated spatially, for drawing convenience, with separate, address, read/-write and data communication links between the different resources. The arithmetic logic unit ALU initiates requests in response to inputs or as part of logical processing steps. Address and read/write commands are placed on the bus to ROM/RAM and data is returned for interpretation and loading in designated microprocessor locations. The program counter PC indicates where the data processing is and where it is going.

The read only memory, ROM, is also referred to herein as the immobile code area. Part of this read only memory, ROM, includes an object area. Frequently used objects are stored in the object area of the read only memory, ROM.

The random access memory, RAM, is primarily an object storage area in which user created objects are stored and accessed.

The function of this system is primarily involved with data processing operations. These processing operations comprise the evaluation of objects. To evaluate an object means to return its value or to execute its definition.

The microprocessor performs the following operations.

1. Copy the contents (a prologue address or an object address) of the location (a place in main memory or auxilliary memory where a unit of data may be stored or retrieved) pointed to or addressed by the interpreter pointer, to the current object pointer.

$$(O < -[I])$$

2. Decode and execute the sequence of instructions recorded at the memory location addressed or pointed to by the current object pointer.

$$(PC < -[O])$$

3. Increment the interpreter pointer by the size of an address. The size is represented by W which is the word size of the microprocessor, for example.

$(I < -I + W)$

4. Copy the interpreter pointer to the current object pointer.

$(O < -I)$

5. Increment the current object pointer by the size of an address.

$(O < -O + W)$

6. Copy the current object pointer O to an auxilliary register AR in the internal random access memory IRAM.

$(AR < -O)$

7. Copy the contents of the location pointed to by the interpreter pointer to the auxilliary register.

$(AR < -[I])$

8. Set the internal counter IC to zero (0).

$(IC < -0)$

9. Increment and decrement the internal counter IC.

$(IC < -IC + 1)$ $(IC < -IC - 1)$

10. Test and branch on the internal counter IC being zero (0).

$(IC = 0?)$

11. Test and branch on the value of the location pointed to by the auxilliary register AR being equal to any one of a predetermined but arbitrary set, as seen in the flow charts.

(COMPOSITE ?)

(END MARKER ?)

$([AR] = PRLG\ ?)$

12. Perform a sequence of data processing operations (called the prologue initialization sequence IS) which are non-branching, non-destructive to any of the information mentioned above and whose encoding occupies a segment at least as long as an address and whose initial segment when interpreted as an address can refer to the immobile code area.

13. Other data processing operations.

Read only memory ROM preferably includes the data which comprises the immobile code area. In particular, it may include the prologue redirection sequence (PRLG) and the prologues for each of the supported object types. It may additionally contain part of the object area.

The random access memory RAM preferably includes that part of the object area where new objects may be created during data processing operations.

Object Execution

Several typical functions of the data processing system of FIG. 5 are described below. Others will be apparent as this description develops.

In executing $O < -[I]$, the following takes place:

(1) ALU places the address I on the bus to ROM or RAM with an order to read, FIG. 6A.

(2) The data [I] (Prologue Address) at address I is returned to ALU.

(3) ALU addresses the data it has just received to the current object pointer O, FIG. 6B. (See also data processing block 2, FIG. 8A.) This data is an address for a location in immobile code memory, for example, and is now processed by ALU as follows:

$PC < -[O]$ (1) ALU places the address O on the bus with an order to read, FIG. 6C.

Figure 6D:
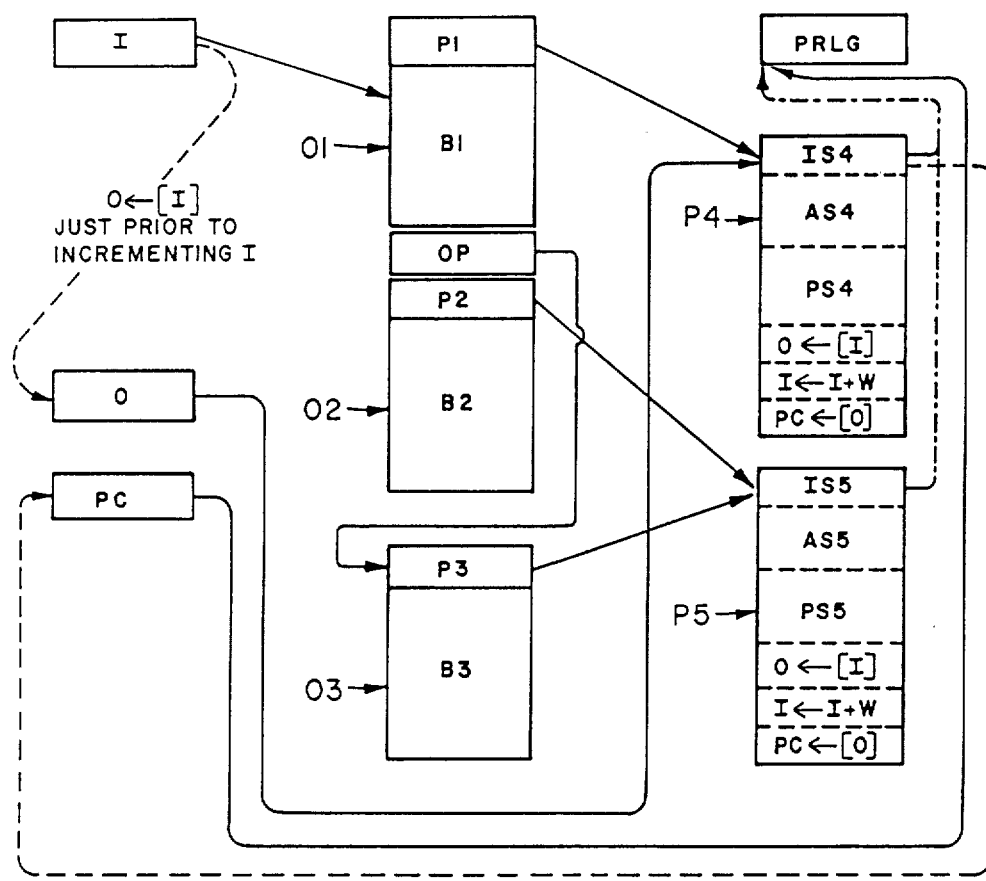

(2) The data [O] address O is returned to ALU which loads this data into the program counter PC, FIG. 6D. (See data processing block 4, FIG. 8A). This data is an address for a redirect execution sequence for direct object execution (FIG. 6D) or an address for indirect object execution (FIG. 7D).

The arithmetic logic unit ALU, after execution of $O < -[I]$ increments the interpreter pointer I, $I < -I + W$, by the word size of the microprocessor to point to the body of the selected object, FIG. 6C. (See also data processing block 3, FIG. 8A).

FIGS. 6A to 6E, 7A to 7E, 8A to 8D, and 9A and 9B illustrate the execution sequence in the preferred embodiment of the present invention. These figures illustrate the key steps in the object execution sequence performed by the data processing apparatus as well as the organization of the essential elements of the data processor in each object execution sequence. It is apparent that this unique process and processor organization may be implemented with conventional microprocessors. Specific sequences and specific steps in evaluating the objects of this invention using an interpreter pointer I, a current object pointer O and an object pointer OP, depend upon the exact type of microprocessor which is chosen in practicing this invention.

Figure 6E:
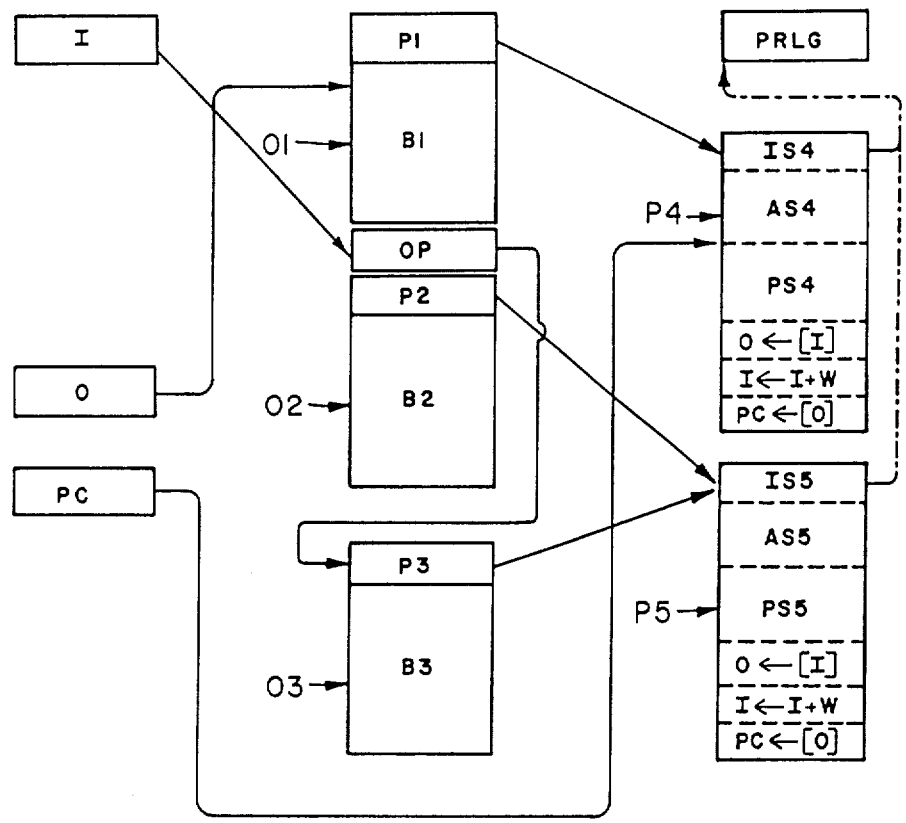
Figure 7B:
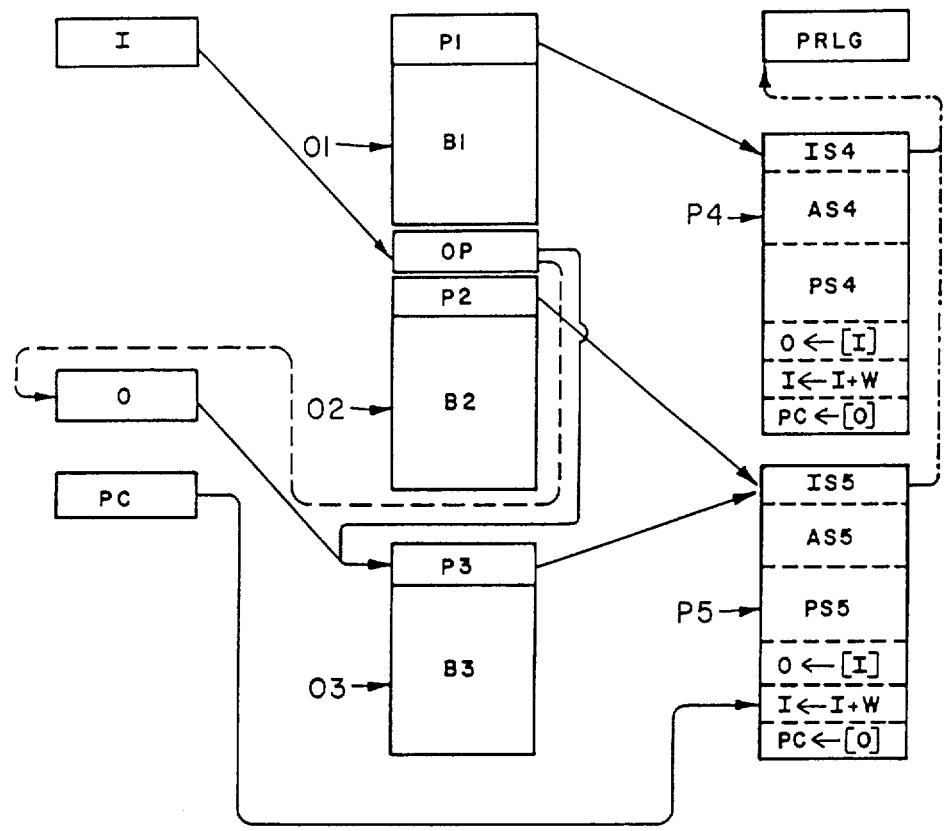
Figure 7C:
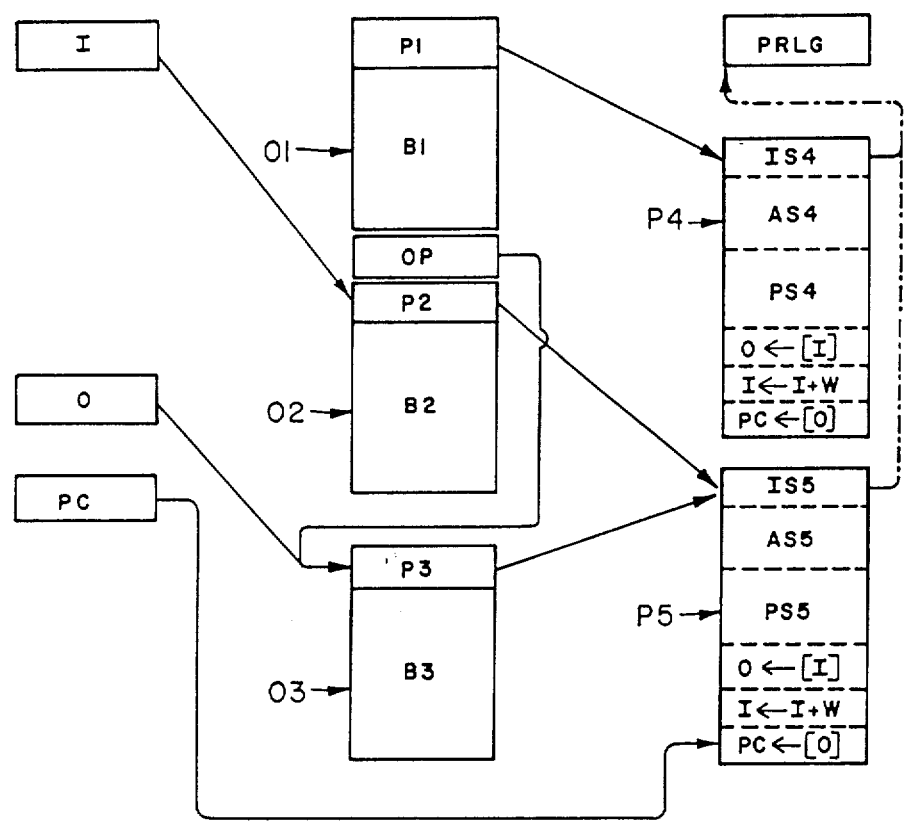
Figure 7D:
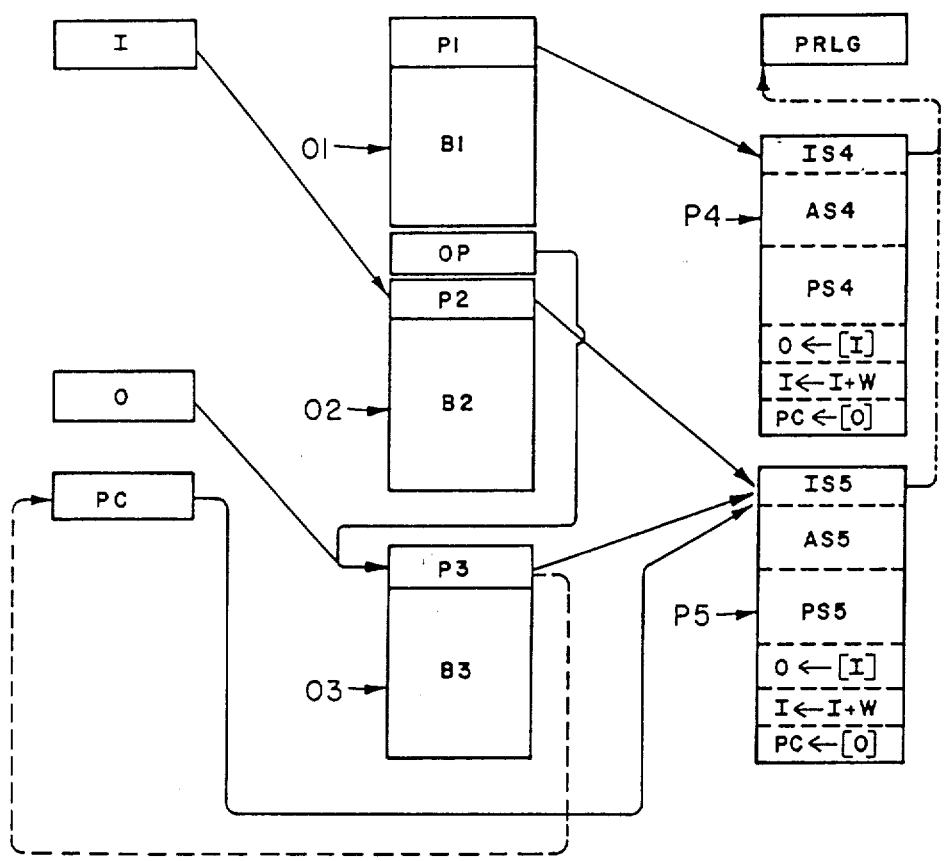

FIGS. 6A through 6E and 7A through 7E illustrate the key steps in the execution of an object. In these figures the interpreter pointer I addresses a memory location in the object area as depicted by the arrow. The current object pointer O addresses a memory location either in the object area, FIG. 7B, of the random access memory RAM, FIG. 5, or the prologue area (FIG. 6B) of the immobile code area in the read only memory ROM, FIG. 5. The program counter PC addresses a memory location in the immobile code area of the read only memory ROM, FIG. 5, as depicted by the arrow (FIG. 6B or FIG. 7B). For simplicity, when the location addressed by one of, the interpreter pointer I, the current object pointer O or the program counter PC, is either irrelevant or may be deduced from the rest of the structure, the arrow illustrating the location addressed will be omitted.

A representative segment of the object area, RAM or ROM is illustrated in each of these figures. In particular the sequence of objects O1, O2 and O3 and object pointer OP are shown. The first object 01 comprises a prologue address P1 and a data segment comprising the body B1 whose structure is determined by the prologue P4 addressed by the prologue address P1. The second and third objects O2 and O3 similarly have prologue addresses P2 and P3 and bodies B2 and B3 whose structures are determined by the prologue P5 which is addressed by both of the prologue addresses P2 and P3. The arrow between the prologue address P1 and the prologue P4, the arrows between the prologue addresses P2, P3 and the prologue P5 and the arrows between OP and P3 symbolize the locations in the immobile code area or memory ROM addressed by those prologue addresses.

A representative segment of the immobile code area of the read only memory ROM is also illustrated in these figures. In particular, the prologue redirection sequence PRLG and the two prologues P4 and P5 are shown. The first prologue P4 includes the prologue initialization sequence IS4, the indirect adjustment sequence AS4 and the data processing sequence PS4. Similarly the second prologue P5 includes the prologue initialization sequence IS5 and indirect adjustment sequence AS5 and a data processing sequence PS5.

The dashed arrows connecting the prologue initialization sequences IS4 and IS5 with the prologue redirection sequence PRLG, are meant to indicate that if the program counter PC is set to point at one of the prologue initialization sequences IS4 or IS5, as in indirect object execution, then the prologue execution sequence is executed. On the other hand, if the program counter PC is loaded with the contents of either the prologue initialization sequence IS4 or the prologue initialization sequence IS5, as in direct object execution, then the program counter PC points to the prologue redirection sequence PRLG which is then executed.

The inner loop data processing functions are shown in the data processing sequences PS4 and PS5 in each of these figures. These are:

$O < -[I]$ $I < -I + W$ $PC < -[I]$

The execution of these individual inner loop functions is discussed above in connection with FIG. 5 and hereinafter in connection with FIG. 6A.

Direct Object Execution Sequence

FIG. 6A, illustrates the initial state for direct execution. In particular the interpreter pointer I points to the prologue address P1 of the object O1 in the object area of one of the memories RAM or ROM, FIG. 5. The prologue address P1 addresses the prologue initialization sequence IS4 of the prologue P4. The program counter under the control of the arithmetic logic unit ALU, points to $O < -[I]$ of the prologue P4. This initiates loading of the current object pointer O with the address [I] for IS4, as seen in FIG. 6B.

FIG. 6B, illustrates the first step in direct object execution wherein the contents [I] (Prologue Address) of the memory location identified in FIG. 6B as P1 and pointed to by the interpreter pointer I, are copied into the current object pointer O. This is indicated by the dashed line. The result, in this case, is that the current object pointer O addresses or points to the prologue initialization sequence IS4 of the prologue P4. The arithmetic logic unit ALU increments the program counter PC to point to $I < -I+W$ of the prologue P4 for incrementing the interpreter pointer I by a microprocessor word size.

FIG. 6C, illustrates the second step in direct object execution where the interpreter pointer I is incremented to point past the memory location P1 and now points at the body B1 of the first object O1. The arithmetic logic unit ALU increments the program counter PC to point to $PC < -[O]$ of the prologue P4.

FIG. 6D, illustrates the third step in direct object execution. Here, the arithmetic logic unit ALU responding to the instruction $PC < -[O]$ loads the contents [O] of the prologue initialization sequence memory location IS4 pointed to by the current object pointer O, into the program counter PC. The result is that the program counter PC now addresses or points to the prologue redirection sequence PRLG and the prologue redirection sequence is executed the address $I,O < -I$, is copied into the current object pointer O.

FIG. 6E, illustrates the fourth and last step in direct execution, wherein the result of executing the prologue redirection sequence is shown. In particular, the interpreter pointer I has been incremented (FIG. 8B processing block 9) to point beyond the body B1 of the object O1 and, hence, points to the object pointer OP which is next in the object area. No processing activity with respect to indirect object execution is initiated by this pointing of the interpreter pointer I. The current object pointer O, having the address of the interpreter pointer I, now points to the body B1 of the object O1 and the program counter PC points to the data processing sequence PS4 of the prologue P4. Processing of the data of the body B1 now takes place.

Indirect Object Execution

FIGS. 7A through 7E illustrate the indirect object execution sequence. In these figures, FIG. 7A illustrates the initial state in which the interpreter pointer I points to an object pointer OP which in turn points to the prologue address P3 of the object O3. As in direct object execution, here also the program counter PC initiates execution of $O < -[I]$ but in prologue P5 which is addressed by the object O3.

FIG. 7B, illustrates the first step in indirect object execution. The arithmetic logic unit, responding to the execution sequence $O < -[I]$, loads the contents [I], now the prologue address P3 of the object pointer OP, into the current object pointer O, as indicated by the dashed line. The result is that the current object pointer O points to the prologue address P3 of object O3. The program counter PC is incremented and initiates execution of $I < -I+W$ of the prologue P5.

FIG. 7C, illustrates the second step in indirect object execution. The interpreter pointer I is incremented by the arithmetic logic unit ALU, responding to the execution sequence $I < -I+W$, to point past the memory location of object pointer OP and now points at the prologue address P2 of the object O2. No further activity in the processing of object O3 results from this incrementation of the interpreter pointer I. The program counter PC is incremented and initiates execution of $PC < -[I]$ of the prologue P5.

FIG. 7D, illustrates the third step in indirect object execution. The arithmetic logic unit ALU, responding to execution sequence $PC < -[O]$, loads the prologue address P3, which is [O], into the program counter PC. The result is the program counter PC now points to the prologue initialization sequence IS5 of the prologue P5 and that the prologue execution sequence is executed which initiates execution of the prologue redirection sequence PRLG.

Figure 7E:
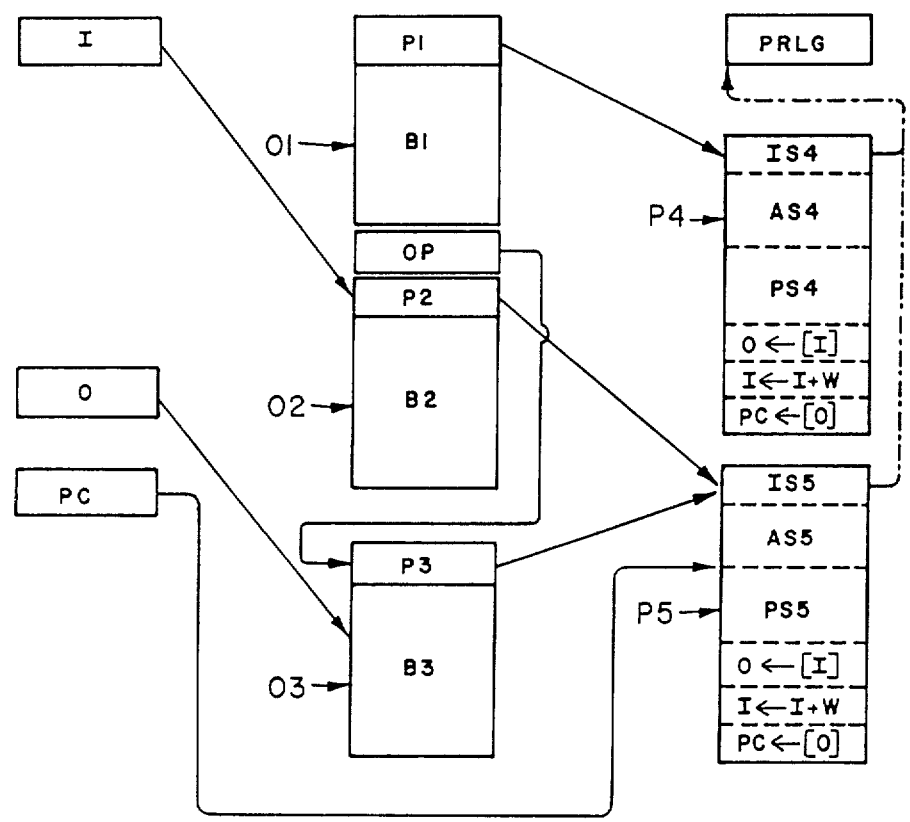

FIG. 7E, illustrates the fourth step in indirect object execution wherein the result of executing the prologue initialization sequence IS5 is shown. In particular, the current object pointer O has been incremented to point past the prologue address P3 and, hence, points to the body B3 of the object O3. The program counter PC has been incremented and now points to the data processing sequence PS5 of the prologue P5. Processing of the data of the body B3 now takes place.

Data Processing Flow Charts

FIGS. 8A through 8D and 9A and 9B are flow charts of the operation of a data processing apparatus in accordance with the present invention. Only those portions of the data processing operations which are relevant to the present invention are outlined in these figures. Other data processing operations being conventional in nature, are not illustrated. The flow charts of FIGS. 8A through 8D, 9A and 9B depict a preferred embodiment of the key steps employed in practicing this invention.

FIGS. 8A through 8D illustrate the flow chart of the operation involved in automatic, combined, direct and indirect object execution, in accordance with this invention. Since this is a repetitive execution loop, a conventional entry has been chosen to agree with FIGS. 6A and 7A.

Initial Processing Phase (Inner Loop)

Figure 8A:
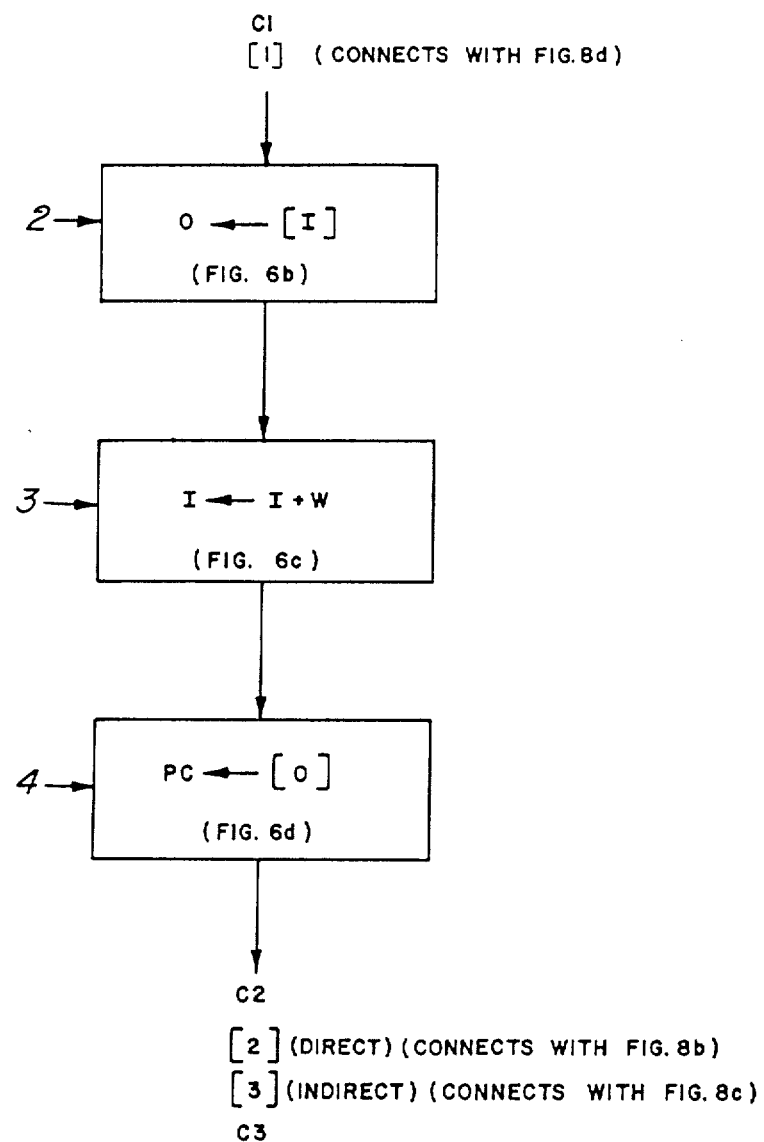
FIGS. 8A through 8D, are execution sequence flow charts, further developing the unique object execution steps and data processor organization of FIGS. 6A through 6E and 7A through 7E.

FIG. 8A, illustrates the initial segment of the flow chart with the conventional entry point at connector C1. In the first processing block 2, the contents [I] of the memory location P1 addressed by the interpreter pointer I are loaded into the current object pointer O under the control of arithmetic logic unit ALU as explained in connection with FIG. 5. In the second processing block 3, the interpreter pointer I is incremented by the word size W of the microprocessor MP. In the third processing block 4, the program counter PC is loaded with the contents [O] of the memory location addressed by the current object pointer O. In the examples described above, in direct object execution the memory location is IS4 and in indirect object execution the memory location is P3. In the case of direct object execution, this implies that the prologue redirection sequence PRLG will be executed next ([O] addresses PRLG, FIG. 6D), and, in the direct object execution case, this implies that the prologue initialization sequence IS5 will be executed next ([O] addresses AS5, FIG. 7D). This situation is indicated by the connectors C5 and C6.

Prologue Redirection Sequence (Direct Execution)

Figure 8B:
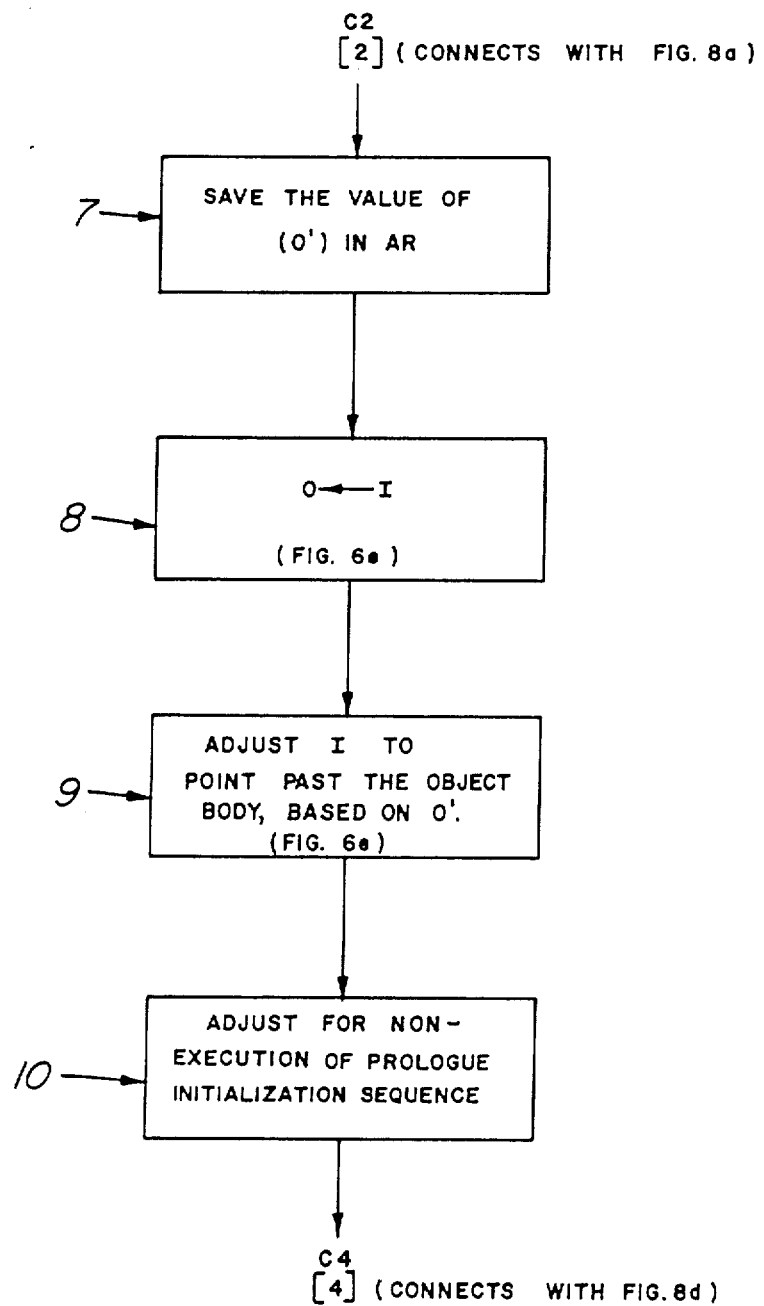

FIG. 8B, illustrates the operation of the prologue redirection sequence PRLG and deals with direct object execution, FIGS. 6A through 6E. This sequence is entered via the connector C2 from the connector C2 of FIG. 8A. In the first processing block 7, the value of the current object pointer O is loaded into an auxilliary register AR (FIG. 5). This value is called O' for convenience. In the second processing block 8, the value of the interpreter pointer I is loaded into the object pointer O, which now points to the body of the object O1, FIG. 6E. In the third processing block 9, the interpreter pointer I is incremented to point beyond the body of the object. This is also seen in FIG. 6E. This is based upon the value O' in the auxiliary register AR. A flow chart illustrating this process is shown in FIGS. 9A and 9B, yet to be discussed. In the fourth processing block 10, those operations are done which are necessary to adjust for the fact that the prologue initialization sequence has not been executed. These are convential in nature and depend strongly on the details of the prologue operations assigned to the prologue. Connector C4 connects the processing block 10 to the data processing block 17 of FIG. 8D.

Operation Of A Prologue (Indirect Execution)

Figure 8C:
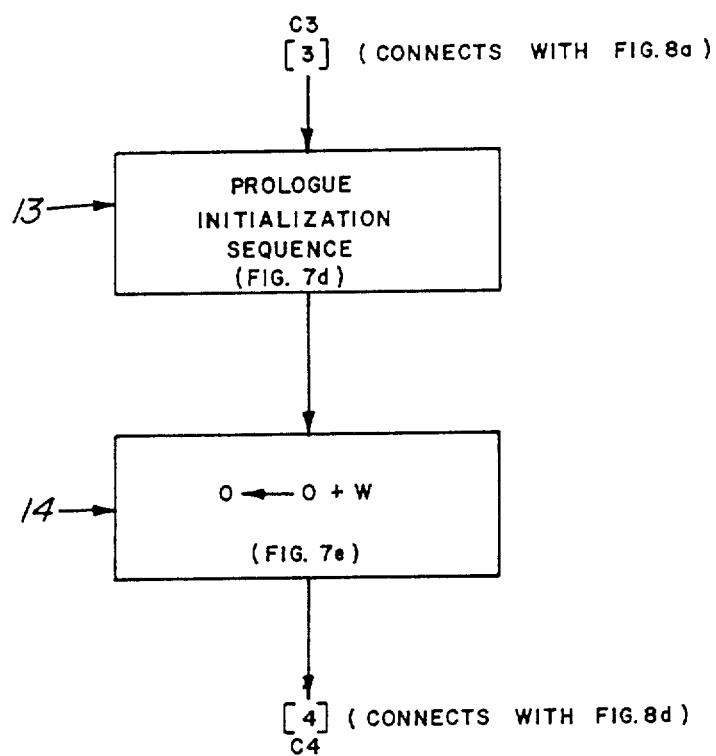

FIG. 8C illustrates the operation of a prologue. This sequence is entered via the connector C3 from connector C3 of FIG. 8A, in the case of indirect exection. In the first processing block 13, the prologue initialization sequence is performed (FIG. 7D). This is conventional in nature and depends strongly on the detail operations of the microprocessor MP. In the second processing block 14, the current object pointer O is incremented to point past the memory location that it currently addresses (FIG. 7e). Execution continues with the data processing operations assigned by the prologue. Connector C4 connects the processing block 14 to the processing block 17 of FIG. 8d.

Figure 8D:
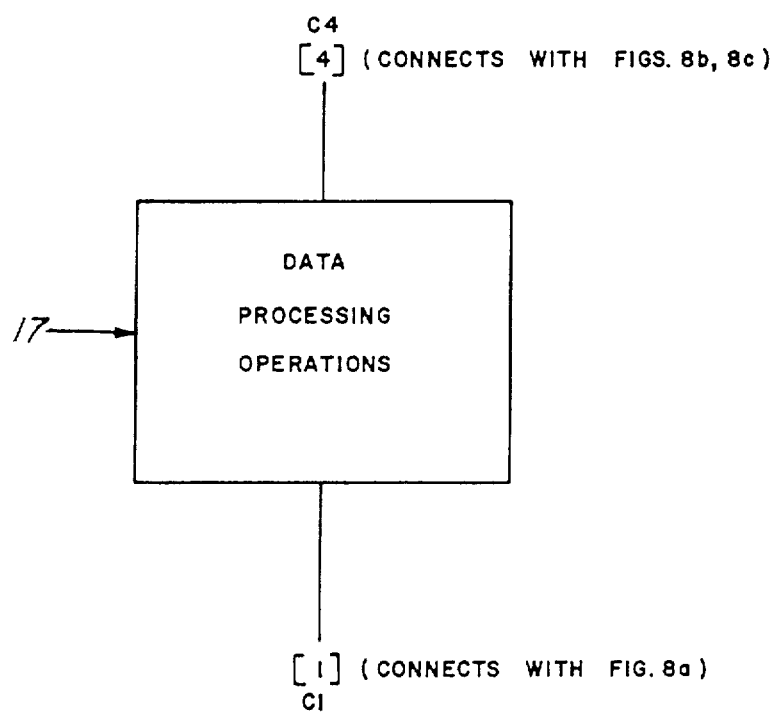
Figure 9A:
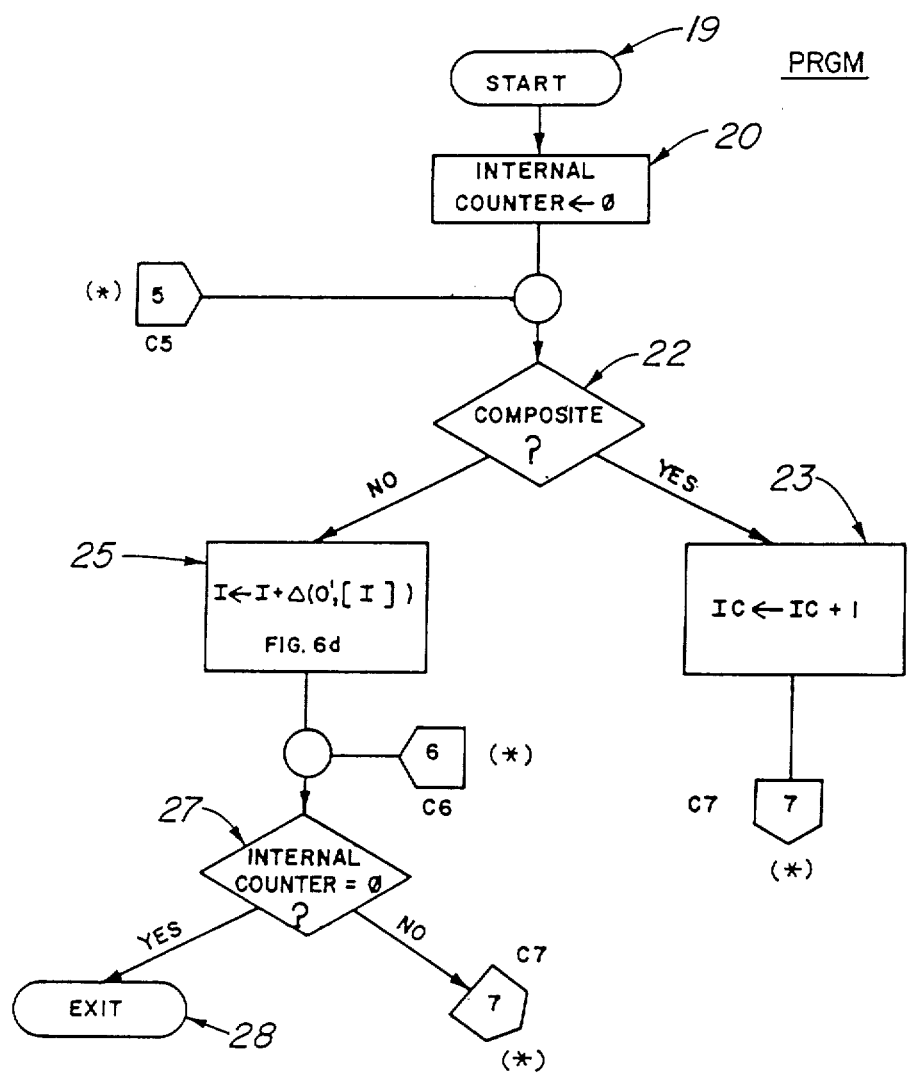
FIGS. 9A and 9B, illustrate a flow chart of a program for incrementing the interpreter pointer.
Figure 9B:
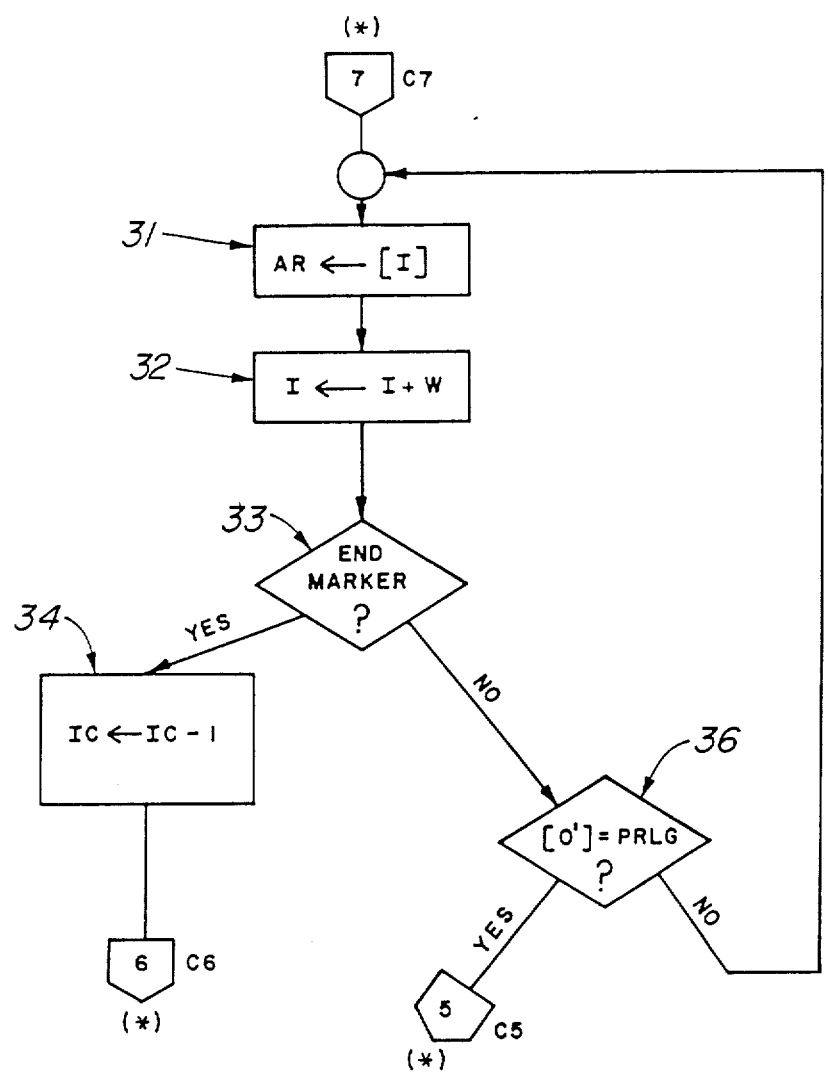

FIG. 8D, illustrates the final part of the object execution sequence. It is entered via connector C4 from connector C4 of FIG. 8B in the direct object execution case and from connector C4 of FIG. 8C in the indirect object execution case (FIGS. 6E and 7E). In this sequence, conventional data processing operations assigned to the prologues (PS4 or PS5) are carried out by processing block 17 and execution returns via connector C1 to the conventional entry point at connector C1 of FIG. 8A.

Processing Program

The flow chart of FIGS. 9a and 9b illustrates a program embodied in the operations of the processing block 9 of FIG. 8B. This is the processing block in which the interpreter pointer I is incremented to point past the object body based on the value of O called O' which is stored in the auxilliary register AR. Entry to this program is via an entry point 19. As a first step, in the processing block 20, the internal counter IC (FIG. 5) is set to zero. Next, in the decision block 22, the program tests to determine whether the value O', in the auxilliary register AR, addresses a composite class prologue. In the event that the value O' in the auxilliary register AR does not address a composite class prologue, the program increments the interpreter pointer I by an amount determined by where if O' addresses a prologue which characterizes a fixed-size object, FIG. 4A then is that fixed size, or, if O' addresses a prologue which charaterizes a counted-size object, FIG. 4B, then is computed from the length indicator which is currently addressed by the interpreter pointer I (processor block 25). Next the program tests whether the internal counter IC is zero (decision block 27). In the event that the internal counter IC is zero, the program exists at exit terminal block 28. In the contrary event the program continues via connector C7 to connector C7 of FIG. 9B.

In the event that the value O' in the auxilliary register AR does not address a composite class prologue, as determined by decision block 22, the internal counter IC is incremented (process block 23) and the program continues via connector C7 from process block 23 to connector C7 of FIG. 9B.

In either of the non-terminal cases described above, the program next loads the auxilliary register AR with the contents [I] of the memory location addressed by the interpreter pointer I, as indicated in process block 31, and increments the interpreter pointer I to point past this memory location, as indicated by process block 32. The program then tests whether the auxilliary register AR addresses the end marker of a composite object (FIG. 4C), as seen in decision block 33. In the event that the contents [I] of the auxilliary register AR address an end marker, the program decrements the counter, as seen in process block 34, and continues via connector C6 to connector C6 of FIG. 9A. In the event that the contents of the auxilliary register AR do not address an end marker, as determined by the decision block 33, the program tests whether the auxilliary register AR addresses an object (as opposed to an object-pointer), as seen in decision block 36. That is, if the contents [I] of the memory location O addressed by the value O' of the auxiliary register AR, in turn addresses a memory location IS4 the contents [O'] of which is the address of the prologue redirection sequence PRLG, then the auxiliary register AR addresses an object, otherwise it addresses an object pointer OP. In the event that the contents of the auxiliary register AR addresses an object, the program continues via connector C5 to the connector C5 of FIG. 9A. In the event that the auxiliary register AR does not address an object, as determined by decision block 36, the program reexecutes the sequence from process block 31 on.

The provision of having prologues whose prologue initialization sequences comprise the address of the prologue redirection sequence PRLG and microprocessor executable instructions for object executions, is a feature which allows both direct and indirect object execution. The uniform structure of the objects, as evidenced in FIGS. 4A through 4C, in which each object comprises a prologue address and a body, which are contiguous in memory, together with definitions of the size of each object, as defined in the prologue address, FIG. 4A, or in a length indicator or in the prologue address and the length indicator, FIG. 4B, or is calculatable, FIG. 4C, permits sequential or selective, or skipping object execution involving specific incrementing of the interpreter pointer I. This minimizes both programming and storage or memory space, conserving processor overhead. In interpretive execution, execution of the object (direct execution) is execution of the object's prologue, and, execution of the object pointer's addressee (indirect execution) is execution of addressee of the addressee's prologue.

Although specific architectual examples and procedures have been presented herein, in describing the preferred embodiment of this invention and the best mode of practicing this invention, it will be appreciated by those skilled in the art that variations in both the architecture and procedures may be made within the spirit and scope of the teachings of this invention.

Industrial Applicability

This invention is applicable in data processors for performing arithmetic, symbolic mathematical and other data processing operations involving the processing of defined objects.

We claim:

1. In the data processing system, means for initiating an object execution sequence comprising:
   a. an object memory;
   b. an object execution memory having locations therein containing prologues of object initialization sequences and execution sequences;
   c. objects in said object memory, each object comprising a body of data and location adress data which is the address of a first location in said object execution memory where an object initialization sequence is recorded, each said first location also comprising memory address data which is the address of another location in said object execution memory where an object execution sequence is recorded;
   d. object pointers indifferently mixed with said objects in said memory, each object pointer comprising object address data which is the address of one object in said object memory, each object pointer accessing said one object in object memory when said each object pointer is accessed;
   e. addressing means for selectively accessing one object or one object pointer in said object memory; and
   f. means responsive to said location address data of an accessed object, for accessing said first location to initiate said object initialization sequence and thereafter responsive to said memory address data to access said another location to initiate said object execution sequence.

2. In a data processing system, means for accessing locations in an object execution memory comprising:
   a. an object memory;
   b. an object execution memory;
   c. objects and object pointers in said object memory, each object having a location address which is the address of a location of object execution sequences is said object execution memory, and, each object pointer having an object address;
   d. addressing means for selectively accessing one object or one object pointer; and
   e. means for accessing the object execution sequences in object execution memory at the location address of that one object accessed directly by said addressing means or indirectly by said one object pointer.

3. In data processing system having stored objects, means for indirectly selecting and processing a stored object, comprising:
   a. a memory;
   b. objects and object pointers in said memory;
   c. each object including a body comprising data for processing and a prologue address;
   d. prologue locations in said memory, each prologue location in memory having recorded thereat object execution instructions;
   e. each object pointer having an object address which is the address for one object;
   f. means for accessing one object pointer;
   g. means responsive to accessing of said one object pointer for accessing the one object having the object address of said one object pointer; and
   h. means responsive to accessing of said one object for accessing the prologue location in memory which is addressed by the prologue address of said one object, for processing the data in the body of said one object.

4. A data processing system, comprising:
   a. an object memory area for storing objects, each object comprising a prologue address and a body of data for processing;

b. a code memory area for storing prologues of processing data for the data of each of said objects of said object memory area, said prologues of processing data including initialization sequences and processing sequences;

c. each prologue address being an address for a prologue of processing data in said code memory area;

d. means including an interpreter pointer for accessing memory locations in said object memory area for selecting one object for processing;

e. means including a current object pointer for first accessing a prologue of processing data in said code memory area addressed by the prologue address of said one object and second for accessing the body of data of said one object; and f. means including a counter for first selecting initialization sequence data from the prologue of processing data which is accessed by said means including a current object pointer and second for selecting processing sequence data from the accessed prologue of processing data for controlling the processing of the data of said one object accessed by said means including a current object pointer.

5. The data processing system according to claim 4, comprising:

a. at least one object pointer in said object memory area comprising a recorded object address which is the address of a selected object;

b. said means including an interpreter pointer also accessing said object pointer;

c. said means including a current object pointer being responsive to said recorded object address from said object pointer when said object pointer is addressed by said interpreter pointer, for first accessing said object address of said selected object and second for accessing the body of data of said selected object.

6. In a data processing system having an object memory, objects and object pointers in said object memory, and a code memory having object execution instructions, a method of processing data in said objects, comprising:

a. selecting an object pointer to address an object;

b. employing data in said object to access object execution instructions in said code memory area for initializing object execution; and c. thereafter accessing different object execution instructions in said code memory area for processing data in said object which is accessed.

7. In a data processing system having an object memory, objects in said object memory, and a code memory having object execution instructions, a method of processing data in said objects, comprising:

a. providing each object with a code memory address;

b. selecting an object for execution;

c. providing object redirection instructions in a first location in code memory;

d. providing data processing execution instructions at a second location in code memory;

e. utilizing said code memory address to access said first location; and f. thereafter accessing said second location.

8. In a dat processing system having an object memory, objects in said object memory, and a code memory having object execution instructions, a method of processing data in said objects, comprising:

a. providing each object with a code memory address;

b. selecting an object for execution;

c. providing an object execution initialization sequence at a first location in code memory;

d. providing data processing execution instructions at a second location in code memory;

e. utilizing said code memory address in said object which is addressed to access said first location; and f. thereafter accessing said second location.

9. In the data processor, means for directly or indirectly addressing and accessing objects for object execution, comprising:

a. memory means;

b. individual prologues of object execution in said memory means;

c. objects in said memory means, each object comprising a prologue address and a body of data for execution, each prologue address being an address for a prologue of object execution in said memory means;

d. object pointers in said memory means, each object pointer being differently structured than said objects, each object pointer comprising an object address which in the address of an object;

e. addressing means for selectively accessing an object or an object pointer; and f. means responsive to accessing of an object which is directly accessed by said addressing means or which is indirectly accessed by said object pointer for accessing a prologue of object execution in said memory means, which is addressed by the prologue address of the object which is accessed.

10. In a data processor, means for directly or indirectly accessing objects for object execution, comprising:

a. an object memory;

b. an object execution memory comprising prologues of object executions;

c. objects in said object memory, each object comprising a prologue address and a body which is data for execution, each prologue address being an address for a prologue of object execution in said object execution memory;

d. object pointers in said object memory, each object pointer being differently structured than said objects, each object pointer comprising an object address which is the address of a prologue address of another object;

e. addressing means for selectively accessing a prologue address of an object or an object address of an object pointer;

f. means responsive to the direct accessing of a prologue address of an object by said addressing means for accessing a prologue of object execution in said object execution memory;

g. means responsive to the indirect accessing of a prologue address of an object by said addressing means via an object pointer for accessing a prologue of object execution in said object execution memory.

* * * * *

UNITED STATES PATENT AND TRADEMARK OFFICE
CERTIFICATE OF CORRECTION

PATENT NO. : 4,868,745

DATED : September 19, 1989

INVENTOR(S) : Charles M. Patton et al.

It is certified that error appears in the above-identified patent and that said Letters Patent is hereby corrected as shown below:

Col. 4, line 37, before "execution" should read --shown--.

Col. 14, Claim 1, line 5, "adress" should read --address--.

Col. 14, Claim 1, lines 13-14, "with said objects in said memory" should read --with said objects in said object memory--.

Col. 14, Claim 3, line 44, "In data" should read --In a data--.

Col. 15, Claim 8, line 64, "dat" should read --data--.

Col. 16, Claim 9, line 13, "In the data" should read --In a data--.

Col. 16, Claim 9, line 27, "in" should read --is--.

Signed and Sealed this

Thirteenth Day of October, 1992

Attest:

DOUGLAS B. COMER

*Attesting Officer*  *Acting Commissioner of Patents and Trademarks*